US007561877B2

(12) United States Patent  
Cassett et al.

(10) Patent No.: US 7,561,877 B2
(45) Date of Patent: Jul. 14, 2009

(54) APPARATUS AND METHODS FOR MANAGING MALFUNCTIONS ON A WIRELESS DEVICE

(75) Inventors: Tia Manning Cassett, San Diego, CA (US); Kenny Fok, San Diego, CA (US); Jihyun Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 575 days.

(21) Appl. No.: 11/251,433

(22) Filed: Oct. 14, 2005

(65) Prior Publication Data

US 2006/0211415 A1    Sep. 21, 2006

Related U.S. Application Data

(60) Provisional application No. 60/663,506, filed on Mar. 18, 2005.

(51) Int. Cl.
*H04Q 7/00* (2006.01)
(52) U.S. Cl. ..................... 455/423; 455/67.11
(58) Field of Classification Search ............. 455/423, 455/425, 67.11, 67.13
See application file for complete search history.

(56) References Cited

U.S. PATENT DOCUMENTS

| 5,603,095 | A   | * | 2/1997  | Uola ................... 455/554.2 |
| 6,317,596 | B1  | * | 11/2001 | Elwin .................... 455/423 |
| 6,587,647 | B1  |   | 7/2003  | Watanabe et al. |
| 7,171,157 | B2  | * | 1/2007  | Lee ......................... 455/8 |
| 7,437,150 | B1  | * | 10/2008 | Morelli et al. ............. 455/420 |
| 2003/0371550 |   |   | 2/2003  | Lee |
| 2003/2248270 |   |   | 12/2003 | Hideaki |

FOREIGN PATENT DOCUMENTS

WO    03073259 A    9/2003

* cited by examiner

*Primary Examiner*—CongVan Tran
(74) *Attorney, Agent, or Firm*—Abdollah Katbab; Nicholas A. Cole

(57) ABSTRACT

Apparatus and methods for managing predetermined malfunction events in a wireless device operating in a wireless communications network. Malfunction event data and operational data are recorded by the wireless device based on a selected malfunction event tracking configuration. Further, a recovery module associated with the wireless device operates to attempt to recover information leading up to and including the malfunction event. The collected information may be transmitted to a user manager in the form of a malfunction event log. The malfunction event log may be analyzed to characterize the malfunction, and is particularly useful for determining the sequence and identity of events leading to the malfunction, including a crash, freeze and reset.

52 Claims, 6 Drawing Sheets

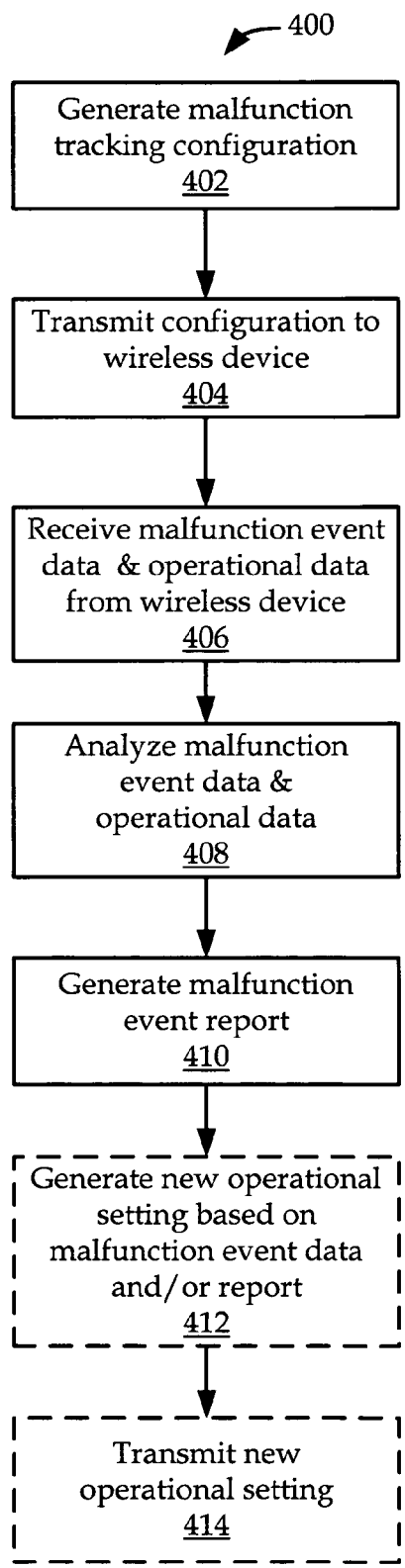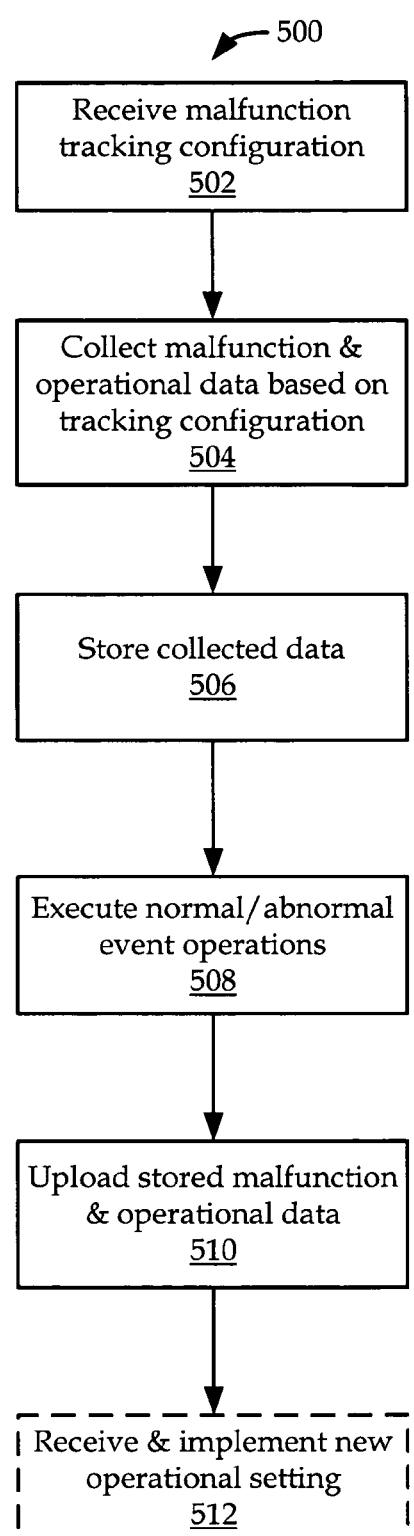
Fig. 4
Fig. 5

APPARATUS AND METHODS FOR MANAGING MALFUNCTIONS ON A WIRELESS DEVICE

CLAIM OF PRIORITY UNDER 35 U.S.C. §119

The present Application for Patent claims priority to Provisional Application No. 60/663,506 entitled "Methods And Apparatus For Tracking Configurable Events In A Wireless Device," filed Mar. 18, 2005, assigned to the assignee hereof and hereby expressly incorporated by reference herein.

BACKGROUND

The disclosed embodiments relate to wireless devices and wireless communication networks, and more particularly, to apparatus and methods for managing operational malfunctions on a wireless device on a wireless network.

Wireless communications devices, such as mobile phones, pagers, handheld computers, etc., have taken on great importance in individuals' business and professional lives. The "wireless" aspect of wireless devices allows individuals to utilize these devices whenever and wherever desired. As the use of wireless devices grows and takes on ever increasing importance, and as the associated wireless communications networks supporting and interacting with wireless devices grow, users have an ever-increasing expectation that wireless devices function flawlessly and without interruption. Thus, one aspect of user satisfaction when utilizing a wireless device deals with the ability of the wireless device to be robust in operation and reliable for frequent usage.

As with other devices having electrical and mechanical components, however, wireless devices do malfunction. Particularly troubling are malfunctions in the manner of the wireless device stopping operations while staying powered on, colloquially referred to as a "freeze," or in a worse scenario, malfunctions in the manner of the wireless device stopping operations and powering down abruptly, colloquially referred to as a "crash."

In these scenarios and other similar malfunctions, the user is required to reset the wireless device, in the manner of turning the device off and re-powering the device. However, the events leading to a freeze, crash, or similar malfunction have either not been kept track of in the device memory, or such event information is lost from memory once the device is powered back up. The foregoing fact makes it difficult, if not impossible, for the network operators providing wireless service to customers, the original manufacturers or producers of the wireless devices, as well as the designers of the wireless devices, to determine the cause of such freezes, crashes, or other malfunctioning events. Without such knowledge and ability to track such events, the foregoing parties are not able to improve the design of wireless devices to prevent future malfunctions.

BRIEF SUMMARY

To address one or more of the drawbacks of the prior art, the disclosed embodiments provide a system, apparatus and method for keeping track of, storing, transmitting, receiving malfunction-related information and managing the occurrence of malfunctions on a wireless device.

In an embodiment, a method for managing malfunctions on a wireless device comprises receiving a tracking configuration identifying a predetermined malfunction event parameter and a predetermined operational data parameter both relating to operation of the wireless device. The method further includes collecting operational data at predetermined times, wherein the operational data is based on the operational data parameter, and collecting malfunction event data when the predetermined malfunction event parameter is detected.

In another embodiment, a computer program is resident in a computer readable medium that, when executed, directs a computer device to perform the actions of receiving an tracking configuration identifying a predetermined malfunction event parameter and an operational data parameter both relating to operation of the wireless device. The actions further include collecting operational data at predetermined times, wherein the operational data is based on the operational data parameter, and collecting malfunction event data when the predetermined malfunction event parameter is detected. Also, the actions include recording the collected operational data in a first portion of a data repository associated with the wireless device, wherein the first portion of data repository is unable to maintain the collected operational data during a power up operation of the wireless device. Additionally, the actions include transferring the collected operational data to a second portion of the data repository when the predetermined malfunction event parameter is detected, wherein the second portion of data repository is able to maintain the collected operational data during a power up operation of the wireless device. Similarly, in another embodiment, at least one processor is configured to perform the above-stated actions.

In yet another embodiment, a wireless device comprises a means for receiving an tracking configuration identifying a predetermined malfunction event parameter and an operational data parameter both relating to operation of the wireless device. The device further includes a means for collecting operational data at predetermined times, wherein the operational data is based on the operational data parameter. The device also includes a means for collecting malfunction event data when the predetermined malfunction event parameter is detected. Additionally, the device includes a means for recording the collected operational data in a first portion of a data repository associated with the wireless device, wherein the first portion of data repository is unable to maintain the collected operational data during a power up operation of the wireless device. Further, the device includes a means for transferring the collected operational data to a second portion of the data repository when the predetermined malfunction event parameter is detected, wherein the second portion of data repository is able to maintain the collected operational data during a power up operation of the wireless device.

In still another embodiment, a wireless device comprises a computer platform having a malfunction manager module operable to receive an tracking configuration identifying a predetermined malfunction event parameter and an operational data parameter both relating to operation of the wireless device. The malfunction manager module is further operable to collect operational data at predetermined times, wherein the operational data is based on the operational data parameter. Additionally, the malfunction manager module is further operable to collect malfunction event data when the predetermined malfunction event parameter is detected.

In another embodiment, a method for managing malfunctions on a wireless device comprises generating a tracking configuration identifying a predetermined operational data parameter and a predetermined malfunction event parameter both relating to operation of the wireless device. The method further includes receiving operational data and malfunction event data collected by the wireless device based on the malfunction event configuration, wherein the operational data corresponds to the predetermined operational parameter and the malfunction event data corresponds to the predetermined malfunction event parameter. And, the method includes generating a malfunction event report based on at least one of the collected operational data and the collected malfunction event data.

In yet another embodiment, a computer program is resident in a computer readable medium that, when executed, directs a computer device to perform the actions of generating an tracking configuration identifying a predetermined operational data parameter and a predetermined malfunction event parameter both relating to operation of the wireless device. The actions further include receiving operational data and malfunction event data collected by the wireless device, wherein the operational data is based on the predetermined operational data parameter and the malfunction event data is based on the predetermined malfunction event parameter. Additionally, the actions include generating a malfunction event report having a malfunction event characteristic based on at least one of the collected operational data and the collected malfunction event data, wherein the malfunction event characteristic is based on a comparison of at least one of the operational data and the malfunction event data with a malfunction standard. Similarly, in another embodiment, at least one processor is configured to perform the above-stated actions.

In another embodiment, an apparatus for managing malfunctions on a wireless device comprises a means for generating an tracking configuration identifying a predetermined operational data parameter, a predetermined malfunction event parameter and an additional malfunction event parameter, the predetermined operational data parameter corresponding to operational data generated during operation of the wireless device, the predetermined malfunction event parameter corresponding malfunction event data generated during operation of the device, and the additional malfunction event parameter corresponding to additional malfunction information to collect when the predetermined malfunction event is detected by the wireless device. The apparatus further includes a means for receiving the collected operational data, the collected malfunction event data and the collected additional malfunction information collected by the wireless device based on the tracking configuration. Additionally, the apparatus a means for generating a malfunction event report based on at least one of the collected operational data, the collected malfunction event data and the collected additional malfunction event information.

In a further embodiment, an apparatus for managing malfunctions on a wireless device comprises a configuration generator in communication with the computer platform and operable to generate a malfunction event configuration having a predetermined operational data parameter and a predetermined malfunction event parameter, wherein the predetermined operational data parameter corresponds to operational data on a computer platform of the wireless device, and wherein the predetermined malfunction event parameter corresponds to malfunction event data on the computer platform of the wireless device. The apparatus further includes a data repository operable to receive the operational data and the malfunction event data collected by the wireless device based on the malfunction event configuration, wherein the operational data is based on the predetermined operational data parameter and the malfunction event data is based on the predetermined malfunction event parameter. The apparatus further includes an analysis engine operable to generate a malfunction event report based on at least one of the collected operational data and the collected malfunction event data.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which:

FIG. 4 is a flowchart of one embodiment of a method, operable on a remote apparatus, for managing malfunction events of a wireless device;

FIG. 5 is a flowchart of one embodiment of a method, operable on a wireless device, for managing malfunction events of the wireless device;

DETAILED DESCRIPTION

The disclosed embodiments include apparatus and methods for tracking and analyzing operational malfunctions in a wireless device, such as wireless device freezes, crashes, resets and inadvertent power downs. The disclosed apparatus and methods are operable to log predetermined activities and operations occurring on the wireless device leading up to and including the operational malfunction. After the operational malfunction, these logs may be retrieved and reviewed to reconstruct the state of the wireless device leading up to and at the time of the malfunction. Thus, the disclosed apparatus and methods enable wireless device activity to be reviewed in order to determine a cause of the malfunction, and in order to prevent future, similar malfunctions.

The disclosed embodiments have particular relevance in determining the reasons for which a wireless device malfunction causes the device to stop operating and/or power down. A normal cessation event on the wireless device occurs, for example, when a user powers down the wireless device voluntarily (by, for example, pressing and holding the ON/OFF switch), or the wireless device power downs automatically due to low battery power. A malfunction event causing cessation of operation or loss of power, on the other hand, refers to a scenario where the wireless device locks up or powers down for any other reason. For example, a malfunction event may occur when the wireless device halts operations while staying powered on, referred to as a "freeze," or when the wireless device stops operations and powers down abruptly, referred to as a "crash," or when the wireless device powers down abruptly and then re-powers up on its own, referred to as a "reset." The described embodiments provide indicators to distinguish between normal cessation events and malfunction events, thereby enabling a review of activities leading to malfunctions of the wireless device, and enabling an understanding of how to avoid future malfunction events.

Figure 1:
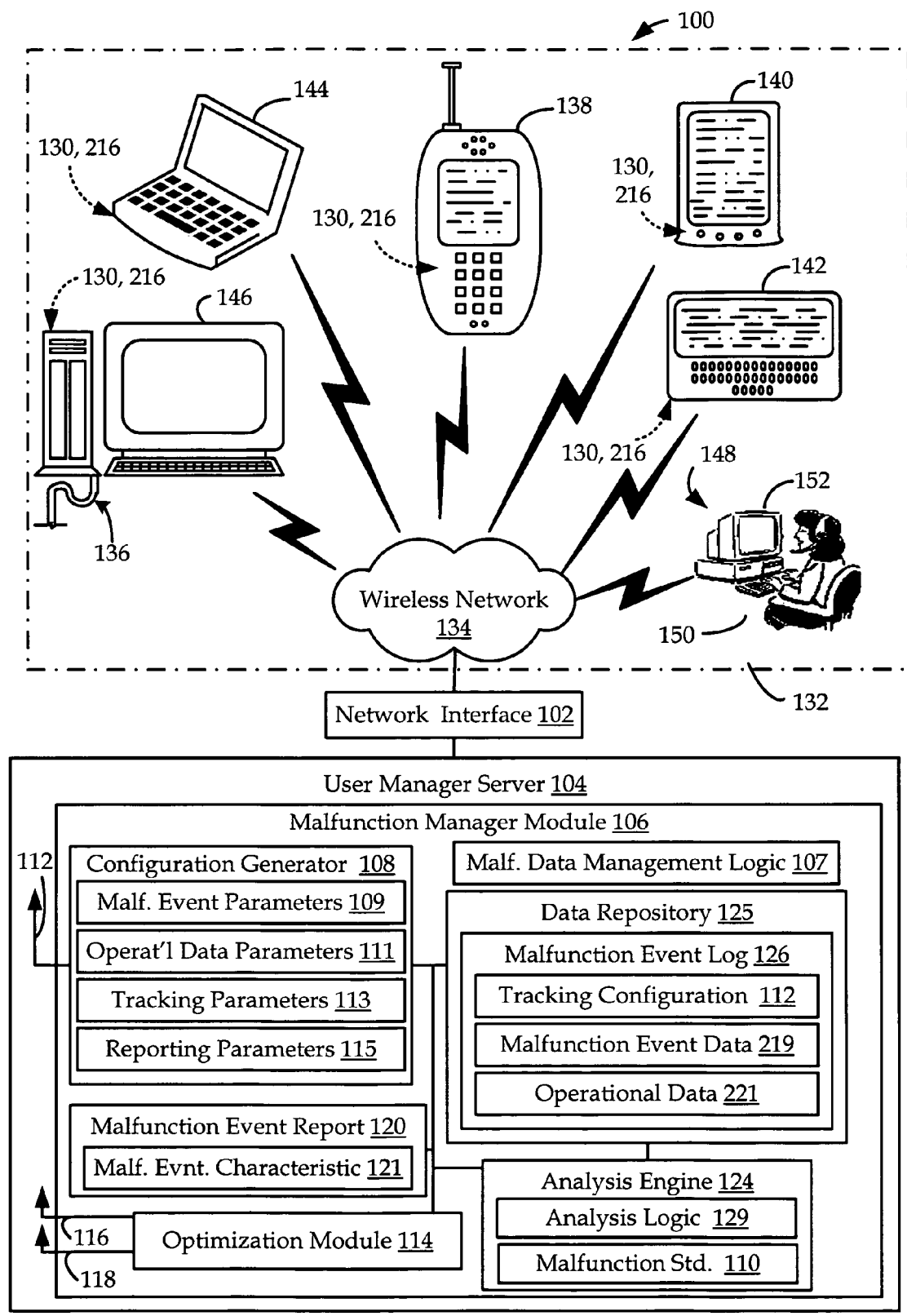
FIG. 1 is a schematic diagram of one embodiment of a malfunction event management system associated with a wireless device and a wireless communication network.
Figure 2:
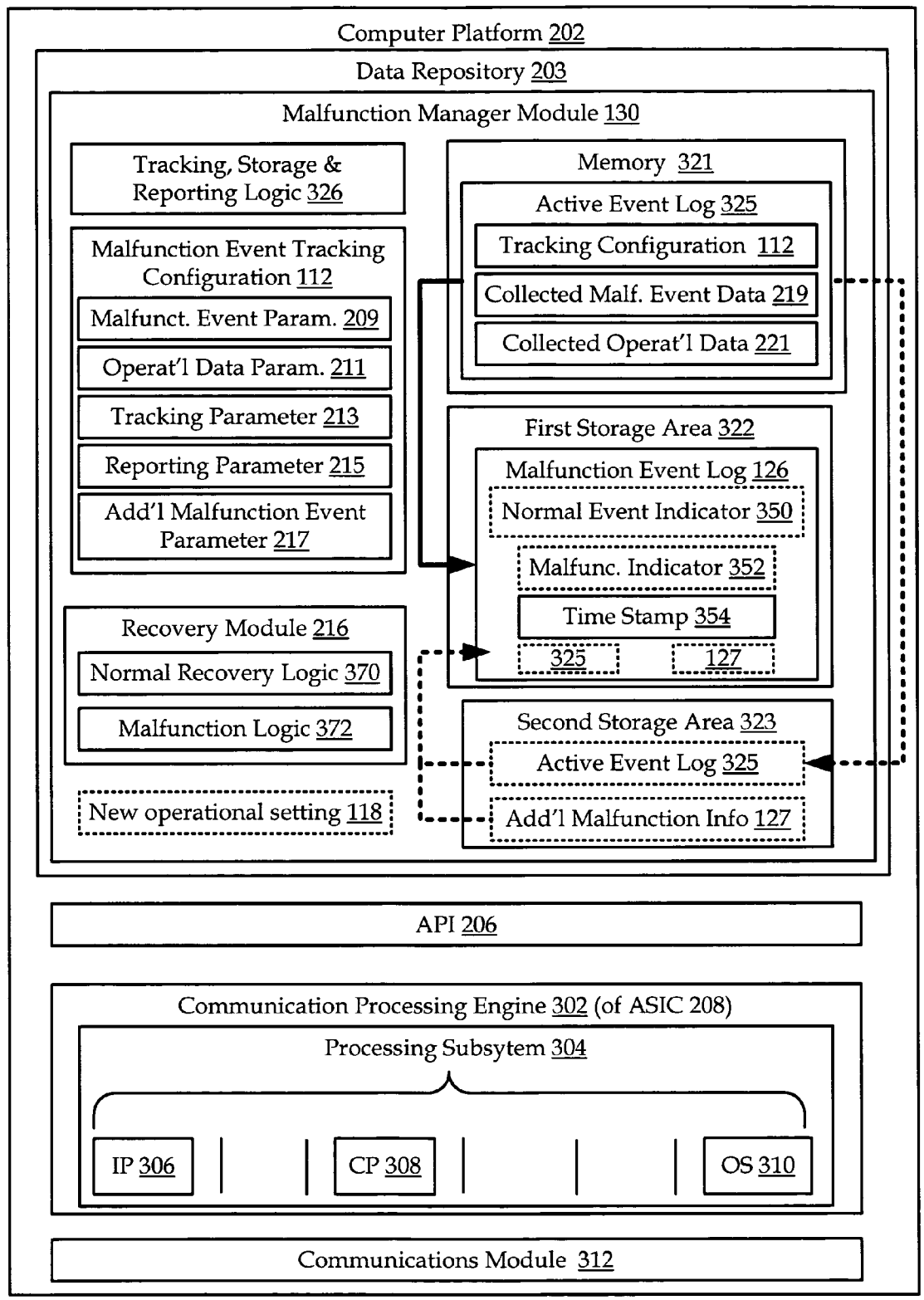
FIG. 2 is a functional architecture diagram of one embodiment of the computer platform of a respective wireless device of FIG. 1.

The following discussion is an overview of the disclosed embodiments. Referring to FIGS. 1 and 2, one embodiment of a device malfunction management system 100 includes a plurality of wireless devices 138, 140, 142, 144, 146. Each of wireless devices 138-146 has resident on it, or remotely accessible by it, a configurable malfunction management module 130 for tracking and storing operational data and malfunction-related information associated with a malfunction event, and a recovery module 216 for retrieving the operational data and malfunction-related information upon powering up of the wireless device. System 100 further includes a remotely located user manager server 104, which has its own malfunction management module 106 operable to dictate tracking and reporting conditions, and operable to analyze the collected malfunction information results. Malfunction management module 106 executes a configuration generator 108 to generate and then transmit a tracking configuration 112 to one or more of the plurality of wireless devices 138-146. For example, the tracking configuration 112 identifies a selected malfunction event parameter 209 (FIG. 3) and/or a selected operational data parameter 211 (FIG. 3) to be tracked on a given wireless device 138-146.

Selected malfunction event parameter 209 includes an identification of a malfunction-related event, which may include a single event, input, value or message, or a predetermined sequence or combination of events, inputs or messages. For example, malfunction event parameter 209 includes a crash event, a freeze event, a reset event, a data abort message, an interrupt handler message, an error message, and any other data that may indicate a malfunction event.

Similarly, selected operational data parameter 211 includes information relating to a general state or status of predetermined components of the respective wireless device, which may include a single event, input or message, or a predetermined sequence or combination of events, inputs or messages. For example, operational data parameter 211 may include a wireless device operational setting value, a state of a wireless device component, a statistic associated with a wireless device system or subsystem, a call stack, one or more register values, a network component operational setting value and/or state, a network component system or subsystem statistic, and any combination of data and events that may be configured by a user. Further, one or more selected operational data parameters 211 may depend on, or correspond to, the one or more selected malfunction event parameters 209.

In response to receiving the tracking configuration 112, tracking, storage & reporting logic 326 of resident malfunction manager module 130 is executed to monitor processing engine 302 of the respective wireless device to track operational data and malfunction events based on configuration 112. Tracking, storage & reporting logic 326 is operable to use malfunction event parameter 209, selected from a plurality of malfunction event parameters 109, and operational data parameter 211, selected from a plurality of operational data parameters 111, to determine what data/events to monitor. Further, logic 326 utilizes tracking parameter 213, selected from a plurality of tracking parameters 113, to determine how and when the data is to be collected and stored. Additionally, logic 326 utilizes reporting parameter 215, selected from a plurality of reporting parameters 115, to determine how and when the data is to be transmitted back to user manager server 104.

For example, tracking, storage & reporting logic 326 may identify malfunction event data 219 and/or operational data 221, within processing engine 302 and corresponding to malfunction event parameter 209 and/or operational data parameter 211, by monitoring one or more processing subsystems 304. In one embodiment, for example, logic 326 may monitor some predetermined input data from an input processing ("IP") component 306 and some predetermined call processing data from a call processing ("CP") component 308. The identified malfunction event data 219 and/or operational data 221 are then collected and stored in memory 321 in active event log 325. For example, memory 321 may be fast read/write memory associated with active programs and data. At some predetermined instance, as dictated by configuration 112 or when memory 321 reaches a predetermined capacity, logic 326 transfers the contents of active event log 325 to malfunction event log 126 in first storage area 322. For example, first storage area 322 may be any type of persistent data repository resident on, or otherwise connected with, the respective wireless device.

Further, resident malfunction management module 130 includes recovery module 216 that aids in identifying normal cessation events and malfunction events, and in recovering information stored during malfunction events. Recovery module 216 includes normal recovery logic 370 that is operable to store one or more parameters, such as normal event indicator 350, corresponding to a normal power down of a wireless device 138-146 in an available data repository, such as in association with malfunction event log 126 in first storage area 322. First storage area 322, for example, may be a persistent and non-volatile data repository, hard drive, electronic file system, etc. Further, in one embodiment, normal recovery logic 370 includes functionality, called out by API 206, associated with one or more applets that handle a normal powering down of the device, including generating normal power down event indicator 350. Similarly, recovery module 216 includes malfunction logic 372, which may be operable to generate and record a malfunction indicator 352, as will be discussed below. Additionally, malfunction logic 372 is operable to store information, such as active event log 325 and additional malfunction information 127, corresponding to a power down or cessation of operation caused by a malfunction (for example, a crash, freeze, reset, or inadvertent power down) in any available memory or storage area. For instance, malfunction logic 372 may first attempt to save information in first storage area 322, however, during many malfunction scenarios, first storage area 322 may either not be available (due to the malfunction) or there may not be enough time to write to first storage area 322. In any case, if first storage area 322 is not available, then malfunction logic 372 looks to save information to any other available memory or storage area, such as second storage area 323. Second storage area 323 includes any type of memory or storage area that is available to receive and save the predetermined information during the given malfunction event, and that further allows the predetermined information to be recovered once the respective device powers up again. For example, second storage area 323 may include, but is not limited to, an unused portion of RAM, a memory card associated with the respective wireless device, and a memory or storage remote from but in communication with the respective wireless device. In one embodiment, besides the parameters being tracked in active event log 325 based on configuration 112, the configuration may dictate one or more additional malfunction data parameters 217 to collect as additional malfunction information 127 during abnormal losses of power or cessation of operations. For example, additional malfunction information 127 may be state information of one or more predetermined wireless device components, the value of one or more predetermined subsystem registers such as program counters, subsystem statistics, etc. Further, active event log 325 may need to be moved from memory 321 because memory 321 may not be a persistent or non-volatile type of memory. Alternatively, the portion of memory 321 where active event log 325 is held may be an area that is over-written or cleared during the normal power-up operations of the respective device. As such, malfunction logic 372 looks to store the predetermined information in a memory or storage area, such as first storage area 322 and/or second storage area 323, that is a persistent or non-volatile type of data repository, and that is an area which is not overwritten or cleared during normal power-up operations. Further, in one example, second storage area 323 is a type of repository that allows for fast writes, where second storage area 323 has a faster writing capability than first storage area 322, which may be a relatively long term storage area compared to second storage area 323. In one embodiment, for example, second storage area 323 may comprise an unused portion of random access memory, while first storage area may comprise an electronic file system. As such, in one example, during the short period of time during which the respective wireless device 138-146 is losing functionality and/or power due to a malfunction event, when malfunction logic 372 would not have enough time to transfer active event log 325 and any additional malfunction information 127 to first storage area 322, second storage area 323 provides a functional repository with non-volatile or persistent capabilities, and sufficient capacity to store this information until the respective wireless device can be powered up. In another example, first storage area 322 may be inaccessible due to the malfunction, for example due to the inoperability of a component necessary to transfer the information to first storage area 322. In this example, malfunction logic 372 may transfer the predetermined information, such as active event log 325 and/or additional malfunction information 127, to any other available storage area where the information may be later recovered, such as second storage area 323. In yet another example, malfunction logic 372 may transfer the predetermined information to a local memory card. In still another example, malfunction logic 372 may transfer the predetermined information to a remote memory or storage area in communication with the respective wireless device.

Upon powering up of a wireless device 138-146, tracking, storage & reporting logic 326 of resident malfunction manager module 130 is operable to determine if a malfunction event caused the previous power down, such as by checking first storage area 322 for predetermined data such as normal event indicator 350 and malfunction event indicator 352, and/or such as by checking second storage area 323 for at least one of active event log 325, additional malfunction information 127, normal event indicator 350 and malfunction event indicator 352. If a malfunction is detected, then resident malfunction manager module 130 is operable to transfer the information from second storage area 323 to malfunction event log 126. Further, based on configuration 112, resident malfunction manager module 130 is operable to selectively transmit log 126 to user manager server 104 for analysis.

Referring to FIG. 1, malfunction manager module 106 of user manager 104 operates analysis engine 124 to analyze, according to predetermined or user-defined malfunction sequences or standards 110, the information included in malfunction event log 126 received from one or more of wireless devices 138-146. For example, predetermined standards 110 may define at least one of a crash, freeze, reset, normal power down, etc. Analysis engine 124 parses the information in malfunction event log 126, compares it to predetermined standards 110, and generates a malfunction event report 120 based on this comparison. Malfunction event report 120 may include a malfunction event characteristic 121 that identifies and/or quantifies the malfunction, for example, based on the above-described comparison of event log 126 with predetermined standard 110. For example, malfunction event log 126 may be a collection of information from one or more wireless devices, and analysis engine 124 may determine any type of relationship between a malfunction event and any one of: each wireless device, each type/model of wireless device, each carrier associated with the one or more wireless devices, each communications protocol associated with each wireless device, each version of hardware/software/firmware associated with the respective wireless devices, and any other information which may be associated with a given wireless device. Malfunction event report 120 may be reviewed manually, such as by a technician, or electronically, for evaluation of the tracked communications and device state information, including a determination of wireless device robustness and stability. Additionally, analysis engine 124 may execute configuration generator 108, based on report 120, to update monitoring and tracking of malfunction-related information in the wireless device or to collect additional malfunction-related information for further analysis.

Figure 3:
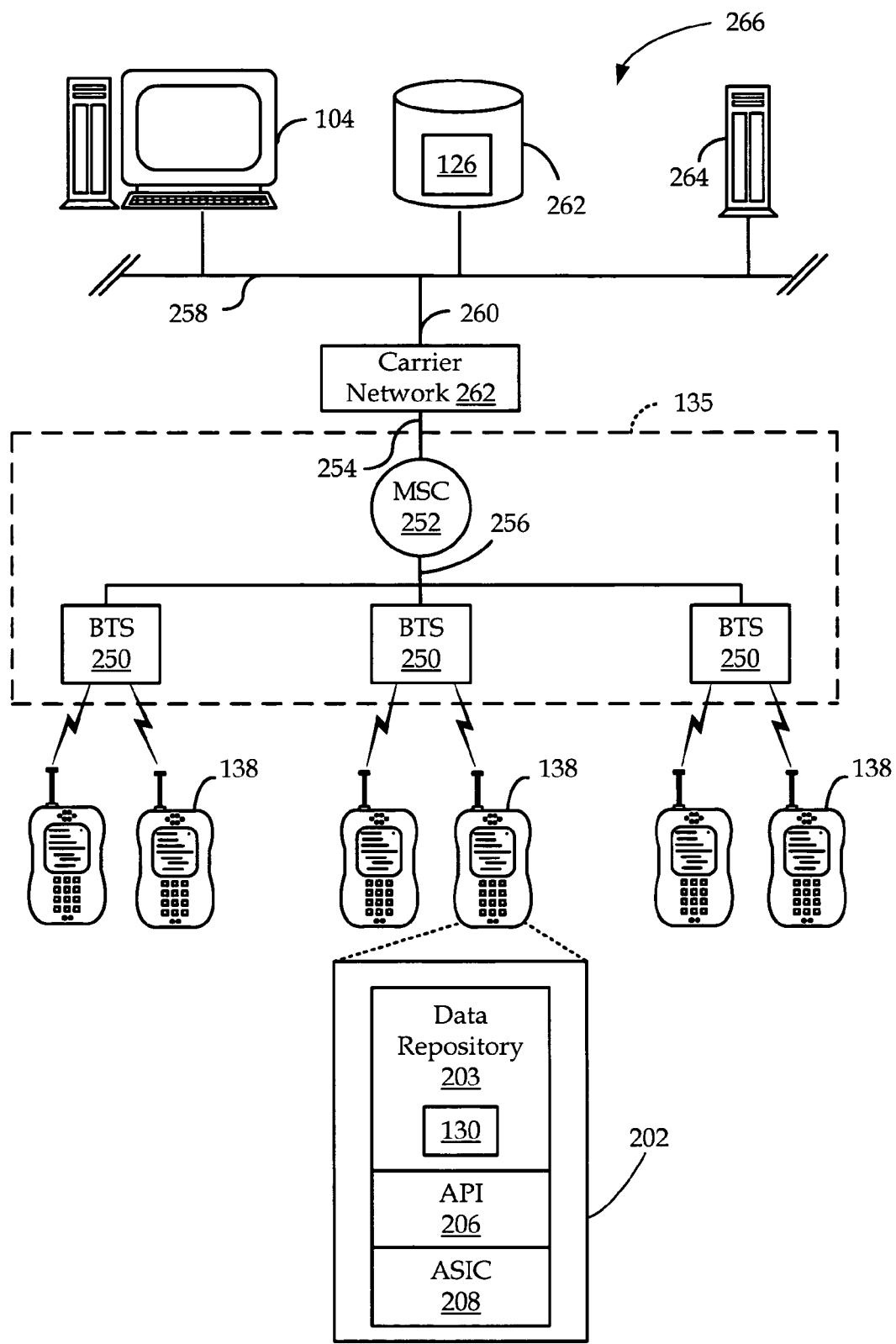
FIG. 3 is a schematic diagram of one embodiment of a cellular telephone network embodiment of the system of FIG. 1.

Referring to FIGS. 1 and 3, wireless network 134 includes any communications network operable, at least in part, for enabling wireless communications between a respective wireless device 138-146 and any other device connected to wireless network 134. Further wireless network 134 includes all network components, such as a base transceiver station ("BTS") 250, and all connected devices that form the network. Wireless network 134 may include at least one, or any combination, of: a cellular telephone network; a terrestrial telephone network; a satellite telephone network; an infrared network such as an Infrared Data Association (IRDA)-based network; a short-range wireless network; a Bluetooth® technology network; a home radio frequency (HomeRF) network; a shared wireless access protocol (SWAP) network; an ultra wide band (UWB) network; a ZigBee® protocol network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio network. Suitable examples of telephone networks include at least one, or any combination, of analog and digital networks/technologies, such as: code division multiple access, wideband code division multiple access, universal mobile telecommunications system, advanced mobile phone service, time division multiple access, frequency division multiple access, orthogonal frequency division multiple access, global system for mobile communication, analog and digital satellite systems, and any other technologies/protocols that may be used in at least one of a wireless communications network and a data communications network.

Network interface 102 may be any mechanism that allows user manager server 104 to communicate across wireless network 134. For example, network interface 102 may include a local area network that connects user manager server 104 through an Internet Service Provider to the Internet, which in turn may be connected to a respective wireless device through a carrier network and a base station.

User manager server 104 may be at least one of any type of server, personal computer, mini-mainframes and the like. User manager server 104 receives logs 126, based on configuration 112, for purposes such as identifying and reconstructing malfunction-related events occurring on a wireless device in order to analyze them to improve the reliability and robustness of wireless devices functioning in wireless network area 132. Further, there can be separate servers or computer devices associated with user manager server 104 that work in concert to provide data in usable formats to parties, and/or a separate layer of control in the data flow between the wireless devices 138-146 and user manager server 104. User manager server 104 includes malfunction manager module 106 and its corresponding components, which can give a ready view of event tracking logs 126 collected from the wireless devices 138-146 in any form, such as tables, maps, graphics views, plain text, or any other type of displayed, and/or printed and/or interactive output. Module 106 may include software, hardware, firmware and generally any executable instructions operable by one or more other processors located resident on user manager server 104, or remotely accessible by it. In one embodiment, for example, malfunction manager module 106 comprises malfunction data management logic 107 which includes executable instructions and data for managing the generation and transmission of configuration 112 to the respective wireless device, as well as the collection, storage and analysis of malfunction event log 126 and malfunction event data 219 and/or operational data 221. Further, malfunction management module 106 and/or user manager server 104 (or plurality of servers) can send software agents or applications, including (1) the resident malfunction manager module 130, and (2) tracking configuration 112, to wireless devices 138-146 in the wireless network area 132 such that the wireless devices return data from their resident applications and subsystems, including event tracking logs 126 bearing collected malfunction event data 219, collected operational data 221, as well as the associated tracking configuration. Malfunction manager module 106 includes configuration generator 108, which comprises any combination of software, hardware, firmware and generally any executable instructions operable by one or more additional processors resident on or remotely accessible from user manager server 104. Further, user manager 104 or malfunction manager module 106 may include a data repository 125, such as any type of local or remote memory and/or storage device, for storing event logs 126.

Additionally, user manager 104 or malfunction manager module 106 may include analysis engine 124, which may comprise at least one of an application-specific integrated circuit ("ASIC"), a chipset, a processor, a microprocessor, a logic circuit, and any other data processing device. In one embodiment, for example, analysis engine 124 may comprise analysis logic 129 which includes software, firmware, executable instructions and data for analyzing log 126 and/or any component of the log and generating malfunction event report 120 and/or malfunction event characteristic 121.

Additionally, malfunction manager module 106 may include optimization module 114 operable to access event record 120 and/or log 126 and apply predetermined algorithms or programs to optimize the settings of one or more device-and/or network-related configurations to reduce malfunction events, such as by reducing access freeze/resets and other unaccounted for power downs or crashes. Optimization module 114 may include any executable instructions operable to analyze event record 120 and/or log 126 and determine revised network-specific operational configuration value changes 116 and/or wireless device-specific operational configuration value changes 118 to reduce the occurrence of malfunction events. Optimization module 114 may include any hardware, software, firmware and/or other set of executable instructions. Additionally, optimization module 114 may be operable to initiate further communications with respective wireless devices 138-146 and/or a network 132 component, such as a base station 250, to retrieve additional event related data associated with the plurality of logs 126, in order to perform further analysis and optimization of one or more event data and associated parameters. The optimizations performed by optimization module 114 may also be performed all or in part by a technician manually reviewing the event record 120, and any associated communications-related data.

Further, system 100 may include a user or operator 148 in communication with user manager 104 and/or wireless devices 138-146. For example, operator 148 may be a technician, customer service representative, etc. of: a communications carrier responsible for providing service to wireless devices 138-146; and/or an equipment maker who manufactured the respective wireless device and/or a component within the respective wireless device. Such a user or operator 148 may be interested in malfunction events in order to improve the quality of service of the wireless network and/or the respective wireless device. In any case, user or operator 148 may access user manager via a computer device having a direct or remote, wired or wireless, connection. As such, user or operator 148 may be able to access and manipulate malfunction manager module 106 as described herein. Further, user or operator 148 may provide inputs to user manager 104 through an input mechanism 150, such as a keyboard, mouse, etc., and may receive outputs from user manager 104, such as report 120 and/or event log 126, through output mechanism 152, such as a display, an audio speaker, a haptic feedback mechanism, etc.

The wireless devices can include any mobile or portable communications device, such as cellular telephone 138, personal digital assistant 140, two-way text pager 142, a laptop computer 144, a tablet computer, and even a separate computer platform 146 that has a wireless communication portal, and which also may have a wired connection 136 to a network or the Internet. Additionally, the wireless device can be a remote-slave, or other device that does not have an end-user thereof but simply communicates data across the wireless network 134. For example, the wireless device may include a remote sensor, a diagnostic tool, a data relay, and the like. The described embodiments for keeping track of, storing, transmitting, and receiving configurable events for a wireless device 138-146 can accordingly be applied to any form of wireless communications device or module, including a wireless communication portal, a wireless modem, PCMCIA cards, access terminals, personal computers, telephones, or any combination or sub-combination thereof.

FIG. 3 is a representative diagram that more fully illustrates the components of a cellular wireless network and interrelation of the elements of one embodiment of the present system. In a cellular telephone embodiment, cellular system 266 may include wireless network portion 135 connected to a wired network 258 via a carrier network 260. The use of cellular telecommunication pathways has been increasing because wireless devices, such as the plurality of cellular telephones 138 illustrated in FIG. 3, are being manufactured with increased computing capabilities and are becoming tantamount to personal computers and hand-held personal digital assistants ("PDAs"), communicating packets including voice and data over wireless network portion 135. These "smart" cellular telephones 138 have installed application programming interfaces ("APIs") 206 onto their local computer platform 202 that allow software developers to create software applications that operate on the cellular telephone, and control certain functionality on the device. Cellular system 266 is merely exemplary and can include any system whereby remote modules, such as wireless devices 138-146, communicate over-the-air between and among each other and/or between and among components of a wireless network portion 135, including, without limitation, wireless network carriers and/or servers.

In system 266, user manager server 104 can be in communication over wired network 258, such as a LAN network, with a separate data repository 262 for storing the data gathered from the remote wireless devices 138-146, such as the respective event tracking logs 126. Further, a data management server 264 may be in communication with user manager server 104 to provide post-processing capabilities, data flow control, etc. User manager server 104, data repository 262 and data management server 264 may be present on the cellular system 266 with any other network components that are needed to provide cellular telecommunication services. User manager server 104, and/or data management server 264 communicate with carrier network 262 through a data link 260, such as the Internet, a secure LAN, WAN, or other network.

Carrier network 262 controls messages (generally being data packets) sent to a mobile switching center ("MSC") 252. Further, carrier network 260 communicates with MSC 252 by a network 254, such as the Internet, and/or POTS ("plain old telephone service"). Typically, in network 254, a network or Internet portion transfers data, and the POTS portion transfers voice information. MSC 252 may be connected to multiple base stations ("BTS") 250 by another network 256, such as a data network and/or Internet portion for data transfer and a POTS portion for voice information. BTS 250 ultimately broadcasts messages wirelessly to the wireless devices, such as cellular telephones 138, by short messaging service ("SMS"), or other over-the-air methods.

Further, each wireless device 138-146, such as a plurality of cellular telephones 138 in this cellular telephone embodiment, has computer platform 202 that can transmit data across wireless network portion 135, and that can receive and execute software applications and display data transmitted from user manager server 104 or another computer device connected to wireless network portion 135.

Computer platform 202 also includes an application-specific integrated circuit ("ASIC") 208, or other chipset, processor, microprocessor, logic circuit, or other data processing device. ASIC 208 or other processor may execute application programming interface ("API") layer 206 that interfaces with any resident programs, such as resident malfunction manager module 130 or recovery module 216, in data repository 203 of the wireless device. API 206 may comprise a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Data repository 203 may include one or any combination of read-only and/or random-access memory (RAM and ROM), EPROM, EEPROM, flash cards, or any memory common to computer platforms. Data repository 203 may also include a local database that can hold the software applications, files, or data not actively used in memory, such as the software applications or data transmitted from user manager server 104. For example, local database typically includes one or more flash memory cells, but can be any secondary or tertiary storage device, such as magnetic media, EPROM, EEPROM, optical media, tape, or soft or hard disk. Additionally, local database can ultimately hold a local copy of resident malfunction manager module 130, recovery module 216, or agents, as well as first storage area 322 and second storage area 323.

Referring back to FIG. 2, in an embodiment, computer platform 202 includes resident malfunction manager module 130 that interfaces with API 206 and is executable by a communications processing engine 302. Resident malfunction manager module 130 may be initially received or updated from user manager server 104, or initially installed on the wireless device 138-146 during manufacturing, or installed or updated by a wireless device user (including a field technician) through a user interface, for example, through a standard HTTP, an FTP or some other data transfer protocol interfaced with API. Communications processing engine 302 may comprise a subcomponent of ASIC 208 of the wireless devices 138-146, such as one or more processors collectively included in or accessible by ASIC 208. In addition, in an embodiment computer platform 202 includes a resident recovery module 216 that interfaces with API 206 and is also executable by a communications processing engine 302.

In one embodiment, API 206 includes a class of software extensions that allow resident or remotely accessible modules, such as resident malfunction manager module 130 and recovery module 216, to be accessed by communications processing engine 302. These software class extensions can communicate with processing subsystems 304 on the wireless device, which allows both data reads and commands. For example, the software extension can send commands, including register for log messages, on behalf of the applications that invoke it. API 206 can then forward the responses of the subsystems to data repository 203, or ultimately across wireless network 134, to user manager server 104. Each resident application on wireless device can create an instance of this new software extension to communicate with the subsystems independently.

Communications processing engine 302 includes various processing subsystems 304 embodied in hardware, firmware, software, and combinations thereof, that enable the functionality of the respective wireless device 138-146 and the operability of the respective device on wireless network 134, such as for initiating and maintaining communications, and exchanging data, with other networked devices. For example, communications processing engine 302 may include one or a combination of processing subsystems 304, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. For the disclosed embodiments, processing subsystems 304 of communications processing engine 302 may include any subsystem components that interact with applications executing on computer platform 202. For example, processing subsystems 304 may include any subsystem components which receive data reads and data writes from API 206 on behalf of the resident malfunction manager module 130 or recovery module 216.

In disclosed embodiments, resident malfunction manager module 130 includes tracking, storage & reporting logic 326 and tracking configuration 112. Tracking configuration 112, which may be received from user manager server 104, includes one or more selected malfunction event parameters 209 and/or selected operational data parameters 211, as well as the selected tracking and reporting parameters 213, 215. Further, as mentioned above, configuration 112 may include additional malfunction data parameters 217 that identify additional information to log in case of a malfunction. For instance, selected malfunction event parameter 209 and/or selected operational data parameter 211 include, but are not limited to, a plurality of industry-wide or carrier-specific messages, message protocols, parameters, data values, etc., such as may be associated with malfunction events and normal cessation events, in order to track and log predetermined information of interest to a user. For example, configuration 112 may be set up through malfunction event parameter 209 to track one specific type of malfunction, or any number of types of malfunctions. Similarly, configuration 112 may be set up through operational data parameter 211 and additional malfunction data parameter 217, to track specific data associated with a given type of malfunction, or any number of data corresponding to the current state of the wireless device.

In response to receiving tracking configuration 112, tracking, storage & reporting logic 326 of resident malfunction manager module 130 is executed to determine: (1) what data to monitor corresponding to an event, based on the selected parameters 209 and 211; (2) when the data is to be processed, based on the selected tracking parameter 213; (3) how the data is to be collected and stored, based on the selected tracking and/or reporting parameters 213 and 215, respectively; and (4) when to the data is to be transmitted back to user manager server 104, based on the selected reporting parameter 215. In one embodiment, one or more processing subsystems 304 are monitored for each selected malfunction event parameter 209 and/or selected operational data parameter 211. Tracking, storage & reporting logic 326 of resident malfunction manager module 130 directs the logging in malfunction event log 126 of the data values associated with the selected parameters 209 and 211 when the data is detected. As one example, predefined sequences corresponding to a communications protocol are monitored. As another example, predefined series of commands, including messages, keystrokes, inputs, outputs, data, and errors, are monitored. As yet another example, any combination of data and events that may be configured by a user is monitored.

In an embodiment, the selected malfunction event parameter 209 and/or selected operational data parameter 211 is an input received by the wireless device 138-146 and the processing data 332 relate to input received by and/or processed by the wireless device 138-146. Exemplary inputs include user input received through a keypad, a touch screen sensor, a picture camera device, a video camera device, and any other type of input. In one embodiment, for example, IP component 306 of processing subsystems 304 is used for determining and keeping track of any or all input received by the wireless device. In this embodiment, tracking, storage & reporting logic 326 is executed by communications processing engine 302 through API 206 to monitor IP component 306 for input data as dictated by tracking configuration 112.

In another embodiment, the selected malfunction event parameter 209 and/or selected operational data parameter 211 is a call processing function performed by the wireless device 138-146 and the collected malfunction event data 219 and/or collected operational data 221 relate to call processing information for the wireless device 138-146 and wireless network 134. Examples of call processing information include information relating to call initiation, call drops, authentication, handoffs, data exchanges, messaging protocols, internal processing and decision-making, etc., associated with processing a voice or data message. In one embodiment, for example, CP component 308 of processing subsystems 304 is used for determining and keeping track of all call processing information for the wireless device 138-146 and wireless network 134. In this embodiment, tracking, storage & reporting logic 326 is executed by communications processing engine 302 through API 206 to monitor CP component 308 for call processing-related data as dictated by tracking configuration 112.

In addition, processing subsystems 304 may include operating system ("OS") component 310, for determining, keeping track of, and handling interruptions relating to wireless device processing, including, for example, a data abort, interrupt handler operations, error messages, etc. OS component 310 may perform its functions in real-time or upon a time synchronized basis. Data aborts, interrupts and error messages may occur, as explained below, upon a wireless device malfunction, including during events relating to a wireless device freeze, crash or reset occurrence. As described below, in the disclosed embodiments OS component 310 is one example of a component monitored by or in communication with tracking, storage and reporting logic 326 and recovery module 216.

In the above-noted embodiments, collected malfunction event data 219 and/or collected operational data 221 are stored in malfunction event log 126 within data repository 203. Initially, for example, this information may be held in active event log 325 in memory 321. Then, active event log 325 may be written to first storage area 322 for longer term storage at predetermined instances, or written to any other available, persistent and recoverable storage area, such as second storage area 323, during malfunctions. Any type of memory resident on or connectable to the wireless device may be used for storage, including local memory and/or storage, as well as memories and/or storage resident on other wireless devices 138-146 or user manager server 104, such as through data uploads across wireless network area 132 or through direct serial connections. In addition, the contents of malfunction event log 126 may be updated according to the above-noted processing due to an updating of or receipt of a new tracking configuration 112 from user manager server 104, or for example from another wireless device 138-146 across wireless network area 132. The malfunction event log 126 may also be updated through the input of commands by the wireless device user, for example, through a standard HTTP, an FTP or some other data transfer protocol interfaced with API, invoking, for example, communications processing engine 302 to execute tracking, storage & reporting logic 326 to update malfunction event log 126.

In one or more embodiments, the contents of the malfunction event log 126 may be transmitted from any wireless device 138-146 to another device on wireless network area 133. As one example, the wireless device transmits log 126 to user manager server 104. As another example, the wireless device transmits log 126 to another wireless device.

As noted, the selected tracking parameter 213 identifies when data is to be retrieved from communications processing subsystems 304. For example, in one embodiment selected tracking parameter 213 includes a predefined time period to control the retrieval from subsystems 304 of information related to the event. Information retrieval may be performed in any known manner, such as for example, based upon periodic or a periodic predefined time periods, based upon any occurrences/events detected by computer platform 202, or based upon manual commands by a technician or other individual using a wireless device 138-146, or remotely from another wireless device 138-146, or user manager server 104. For example, in one embodiment wherein the predefined time period is periodic, upon each periodic interval configuration, tracking, storage & reporting logic 326 is operable to write a timestamp 354 in first storage area 322 of data repository 203.

In other embodiments, the aforementioned time based and event based read triggers are performed dynamically by the wireless device 138-146 in real-time. For example, tracking, storage & reporting logic 326 is executed based upon matching characteristics or parameters to entries in a relational table. The characteristics or parameters may be, for example, sequential combinations of data generated and/or measured by processing subsystems 304, including IP component 306 information, CP component 308 information and OS component 310 information.

In disclosed embodiments, as discussed above, recovery module 216 includes normal recovery logic 370 and malfunction logic 372. Recovery module 216 may be initially received or updated from user manager server 104, or initially installed on the wireless device 138-146 during manufacturing, or installed or updated by a wireless device user (including a field technician) through a user interface, for example, through a standard HTTP, an FTP or some other data transfer protocol interfaced with API.

Normal recovery logic 370 is operable to store one or more parameters corresponding to a normal power down of a wireless device 138-146 in first storage area 322. As shown, an exemplary normal recovery parameter is a normal event indicator 350. As noted, in one embodiment a time stamp 354 is periodically stored in embedded memory.

Malfunction logic 372 of a recovery module 216 is operable to store one or more parameters corresponding to a malfunction of a wireless device 138-146 in first storage area 322 or second storage area 323. Exemplary malfunctions include a crash, freeze, reset, or inadvertent power down of the wireless device 138-146. As shown, an exemplary malfunction parameter is a malfunction indicator 352 which may be written into first storage area 322 if there is enough time to do so during the malfunction. In addition, the contents of active event log 325 may be written to second storage area 323, which could be any available and functional persistent memory that is unused, i.e. that allows for recovery of the information upon re-powering up of the respective wireless device. As another example, additional malfunction information 127, as defined by the selected additional malfunction data parameter 217 and which includes information associated with operational functions or states of the wireless device, may be written to second storage area 323.

In an example of a malfunction event, such as a data abort event, OS component 310, such as a real time executive component in a wireless device, may work with malfunction logic 372 to handle the data storage and recovery operations. In an exemplary embodiment, upon the occurrence of the data abort event, OS component 310 invokes a data interrupt event handler module, which in a data abort operation, through messages, protocols, parameters, characteristics, etc., attempts to store unsaved data in an available and recoverable storage area. As one example, the contents of active event log 325 and tracking configuration 112 may be written to second storage area 323. As another example, the relevant parameters associated with malfunction event parameter 209, operational data parameter 211 and additional malfunction event parameter 217 of the wireless device may be stored in second storage area 323.

Upon re-powering up of a wireless device 138-146, tracking, storage & reporting logic 326 of resident malfunction manager module 130 is operable to determine from first storage area 322 and/or second storage area 323 if a malfunction event caused the previous power down. The foregoing may be accomplished in multiple manners, as described below. Upon determination of whether a malfunction event caused the previous power down, recovery module 216 operates to retrieve the information stored during the malfunction and write this information into malfunction event log 126 in first storage area 322.

In one embodiment, recovery module 216 checks first storage area 322 for a normal power down indictor 350. In a related embodiment, the mere presence of the normal power down indictor 350 indicates that the previous power down was normal and no malfunction event had occurred.

In one embodiment, recovery module 216 checks first storage area 322 for the last time stamp 354 stored there before powering down of the wireless device 138-146. Upon powering up, the difference between the current time and the time stamp 354 is compared to a fixed predetermined time interval. If the difference is a greater amount of time than the fixed predetermined time interval, and indicator 352 indicates that the wireless device was not powered down normally, it is determined that a malfunction event occurred.

In one embodiment, recovery module 216 checks first storage area 322 for a malfunction indicator 352. In a related embodiment, the presence of the malfunction indictor 352 indicates that the previous power down was due to a malfunction event. In another related embodiment, the presence of the malfunction indictor 352 merely indicates that the previous power down was likely due to a malfunction event. Here, one or any combination of other storage areas, which may be predetermined storage areas such as second storage area 323, are checked to corroborate whether the previous power down was due to a malfunction event.

In one embodiment, recovery module 216 checks second storage area 323 for the presence of data stored therein before power down by the above-noted data interrupt handler module. The data may be the contents of active event log 325 and tracking configuration 112, or alternatively the relevant parameters associated with operational functions of the wireless device, such as operational data 221 and additional malfunction information 127. In one related embodiment, the mere presence of the data indicates that the previous power down was due to a malfunction event. In another related embodiment, the presence of the data is corroborated with the presence of a normal event indicator 350 or malfunction indicator 352, or the foregoing time stamp comparison, to determine whether the previous power down was due to a malfunction event.

In one or more embodiments, if it is determined that the previous power down was due to a malfunction event, after recovering any stored information from second storage area 323, resident malfunction manager module 130 is operable to transmit the wireless device malfunction event log 126 to user manager server 104, or to another wireless device 138-146.

In one embodiment, malfunction event log 126 and/or malfunction event report 120 is used to reproduce the information contained in the respective wireless device at the time of the malfunction event to test and improve wireless device functionality, either at user manager server 104, or in an alternative wireless device testing environment. In a related embodiment, malfunction event log 126 and/or malfunction event report 120 is transmitted to manufacturers of wireless devices to test and improve the robustness and stability of later versions of wireless devices.

In operation, referring to FIG. 4, one embodiment of a method 400, operable on a remote apparatus, for managing malfunctions on a wireless device includes generating a malfunction tracking configuration (Block 402). For example, referring to FIGS. 1 and 3, a remotely located operator 148 accessing user manager server 104 and malfunction manager module 106 may execute configuration generator 108 to select from among a plurality of malfunction event, operational data, tracking and reporting parameters 109, 111, 113 and 115, respectively. The selected parameters 209, 211, 213, 215 and 217 then form tracking configuration 112.

Further, this embodiment of the method includes transmitting the malfunction tracking configuration to a wireless device (Block 404). For example, operator 148 may execute malfunction manager module 106 to send configuration 112 across wireless network 134 to one or more wireless devices 138-146.

Additionally, this embodiment of the method includes receiving malfunction event information from the wireless device (Block 406). For example, based on selected reporting parameter 215, the respective wireless device transmits the collected malfunction event log 126 across wireless network 134 to malfunction manager module 106.

Further, this embodiment of the method includes analyzing the received malfunction event information (Block 408) and generating a malfunction event report based on the analysis (Block 410). For example, malfunction manager module 106 executes analysis engine 124, which may compare event log 126 with some predetermined malfunction standard 110 in order to determine malfunction event characteristic 121. For example, analysis engine 124 may compare the one event, or a sequence of events or entries in log 126 to known events and/or sequences associated with a crash, freeze, reset and/or inadvertent power down in order to characterize the malfunction.

Optionally, this embodiment of the method may include generating a new operational setting for the wireless device based on the malfunction report and/or the received malfunction information (Block 412). For example, malfunction manager module 106 may execute optimization module 114 to apply predetermined optimization algorithms to event log 126 and/or event report 120 in order to determine new operational settings 116, 118 for the respective wireless device, or a respective network component, in order to avoid future malfunctions from occurring.

A subsequent additional optional action for this embodiment of the method includes transmitting the new operational setting (Block 414). For example, malfunction manager module 106 may execute to transmit new operational setting 116, 118 across wireless network 134 to the respective wireless device 138-146 and network component.

Corresponding to the method of FIG. 4, and now referring to FIG. 5, one embodiment of a method 500, operable on a wireless device, for managing malfunctions associated with abnormal power downs includes receiving a malfunction tracking configuration (Block 502). For example, as noted above, a resident malfunction management module 130 on a respective wireless device 138-146 may receive malfunction tracking configuration 112 transmitted by malfunction manager module 106 from across wireless network 134.

Further, this embodiment of the method includes collecting operational and malfunction data based on the received tracking configuration (Block 504). For example, resident malfunction management module 130 executes tracking, storage and reporting logic 326 to collect malfunction event data 219 and operational data 221, as dictated by the parameters of configuration 112, into active event log 325. Active event log 325 may initially be stored, for example, in an active portion of data repository 203, such as in memory 321. Memory 321 comprises a fast access memory to enable efficient collection of malfunction and operational information, but memory 321 may not be persistent or non-volatile, and/or memory 321 may be a portion of data repository 203 that is overwritten or cleared during the power up operations of the respective wireless device.

Additionally, this embodiment of the method includes storing the collected data (Block 506). For example, resident malfunction management module 130 executes tracking, storage and reporting logic 326 to write active event log 325 into malfunction event log 126, which is held in first storage area 322. In contrast to memory 321, first storage area 322 may allow relatively slower access, but may be a persistent/non-volatile type of storage enabling retrieval of malfunction event log 126 at any time.

Figure 6:
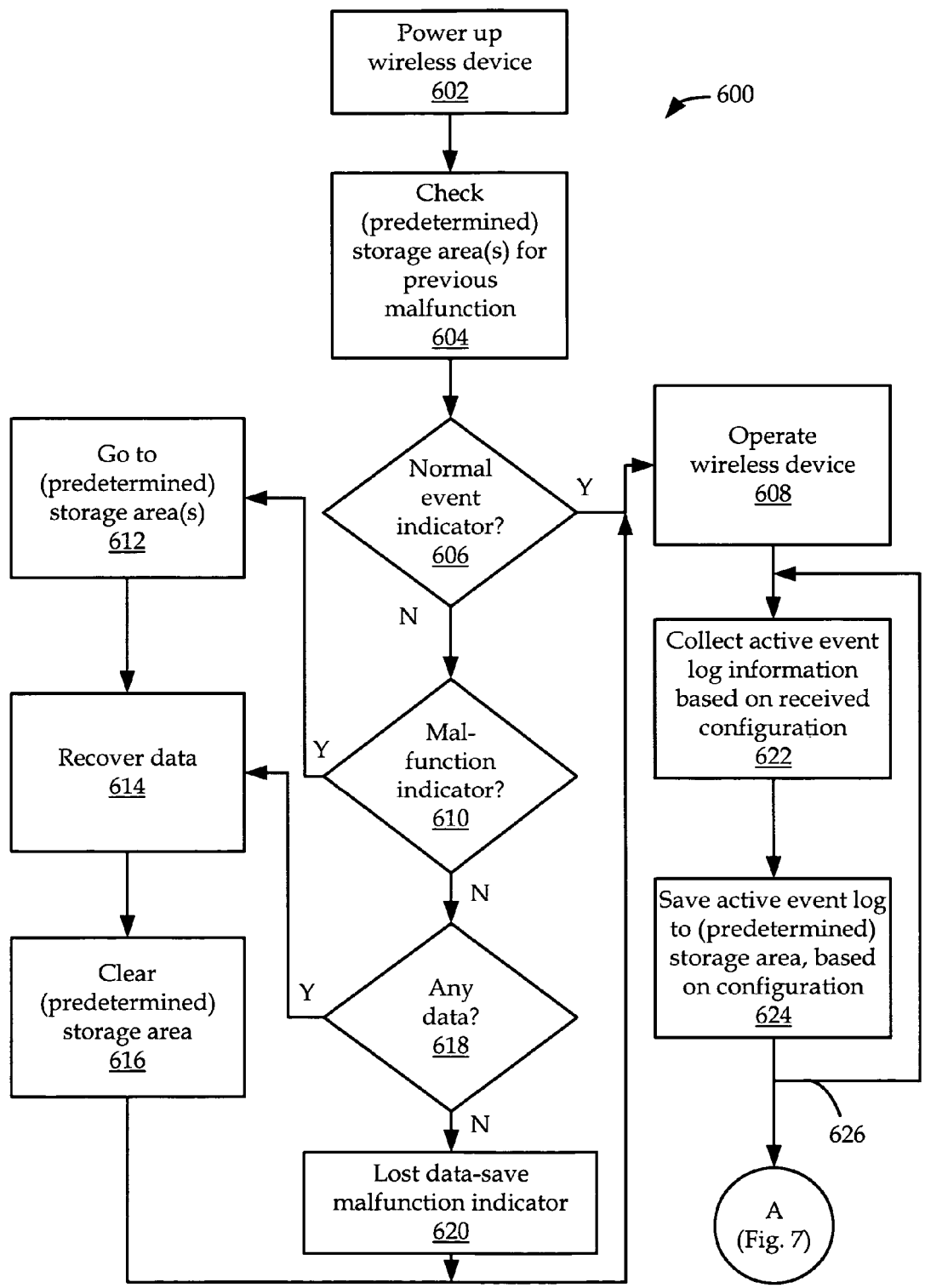
FIG. 6 is a flowchart of one embodiment of a method for determining if a malfunction event has occurred on a wireless device, and for managing malfunction information.
Figure 7:
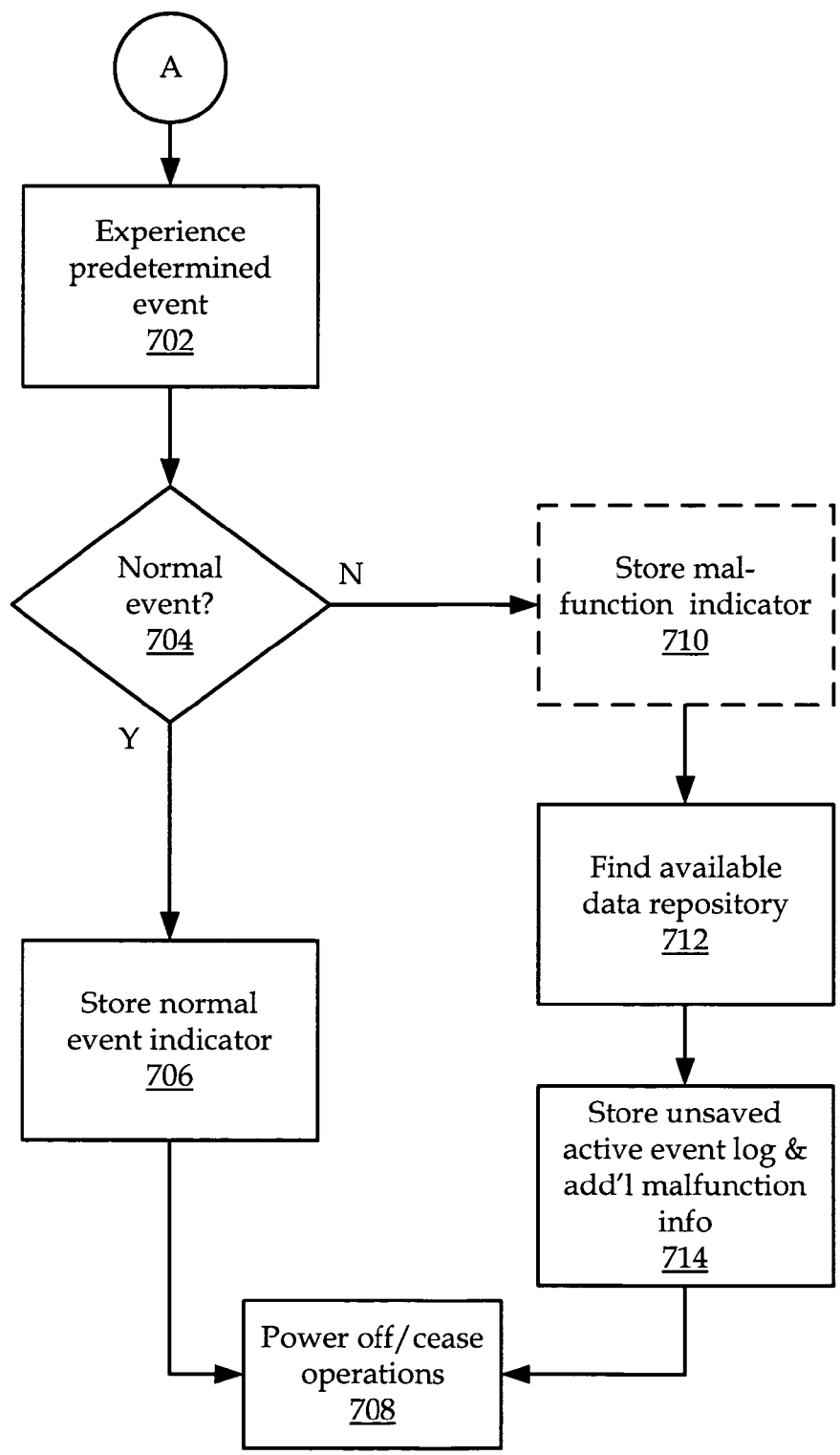
FIG. 7 is a flowchart of one embodiment of a method for determining between a normal power down event and a malfunction event, and for storing associated indicators and/or data.

Further, this embodiment of the method includes executing normal or abnormal power down operations (Block 508). For example, resident malfunction management module 130 may execute recovery module 216 to save logs, parameters, indicators, etc. when a normal power down event or an abnormal power down event are detected. Refer to FIGS. 6 and 7 for a detailed description of these operations, as described below in more detail.

Additionally, this embodiment of the method includes uploading the stored malfunction and operational information (Block 510). For example, resident malfunction management module 130 may execute tracking, storage and reporting logic 326 to transmit malfunction event log 126 across wireless network 134 based on reporting parameter 215 of configuration 112.

Optionally, this embodiment of the method may include receiving and implementing a new operational setting (Block 512). For example, resident malfunction management module 130 may receive new operational setting 118, which may be a new value or a wholly new operational parameter, which affects an operational characteristic of the respective wireless device. As noted above, new operational setting 118 is designed to change a functionality of the respective wireless device, based on the previously-collected malfunction event log 126, to avoid a similar, future malfunction event.

Referring to FIGS. 6 and 7, one embodiment of a method 600 of recovering malfunction-related information includes powering up a wireless device (Block 602) and checking a predetermined storage area for an indication of a malfunction (Block 604). For example, when a user depresses the ON/OFF key, malfunction manager module 130 executes recovery module 216 to look in certain locations of a data repository 203 to determine if indicators and/or malfunction information has been previously saved. For example, in one embodiment, the method includes determining if there is a normal event indicator present in the data repository (Block 606). For instance, in one embodiment, recovery module 216 may check first storage area 322 for normal event indicator 350. If a normal event indicator is found, then the method may conclude that there has not been a malfunction, and normal operation of a wireless device follows (Block 608). On the other hand, if a normal event indicator is not found in data repository 203, then the method may further include checking for a malfunction indicator (Block 610). For instance, in one embodiment, recovery module 216 may execute to check storage area 322 for malfunction indicator 352. If a malfunction indicator is found, then the method includes going to a predetermined storage area (Block 612) and recovering the data found there (Block 614). For instance, in one embodiment, recovery module 216 may execute to go to second storage area 323 and collect active event log 325 and/or additional malfunction information 127, and write this data into malfunction event log 126 within first storage area 322. Next, the method includes clearing the predetermined storage area where the recovered data was found (Block 616), and then proceeding with normal operation of the wireless device (Block 608).

Alternatively, if a malfunction indicator was not found in data repository 203 (Block 610), then the method may proceed to determine if any data is found in the predetermined storage area (Block 618). For example, in one embodiment, in the prior action of checking for malfunction indicator (Block 610), the method may include keeping track of the presence of any data. As such, if data is found, then the method includes the previously discussed actions of recovering the data (Block 614), clearing the predetermined storage area (Block 616), and then proceeding to normal operation of a wireless device (Block 608). Alternatively, if no data is found (Block 618), then the method concludes that data has been lost, and may save a corresponding lost data malfunction indicator to the data repository (Block 620). For instance, the lost data may be a result of a crash or a reset.

It should be noted that the actions as described above with regard to Blocks 606, 610, and 618, and their ensuing operations, in other embodiments, may be performed individually, or in any combination, and may be redundantly performed to ensure that no unsaved malfunction related information is lost.

Additionally, it should be noted that the method may include granting access to event log 126 and/or malfunction event report 120 to other business or commercial systems. To ensure the security and/or integrity of the collected product acceptance data, such access may be granted in a monitored fashion such as through a user manager. Further, other computer devices, including both storage and processing devices, can be located across the wireless network from the wireless device, and accordingly, the architecture associated with the user manager is readily scalable.

In summary, each wireless device 138-146 can have at least one malfunction manager module, application or agent resident (either permanent or temporarily) on the computer platform 202 thereof which causes the gathering of malfunction information from communications processing engine 302, and which can effect selective transmission of the gathered information in event log 126 to another computer device (such as user manager server 104) on the wireless network 134. If the wireless device 138-146 is so embodied, event log 126 may be transmitted over an open communication connection from the wireless device 138-146 to the wireless network 134, such as an open voice or data call. If the wireless device is a cellular telephone 138 and the wireless network is a cellular telecommunication network, such as shown in FIG. 2, event log 126 can be transmitted through short message service or other wireless communication methods.

In view of the method being executable on computer platform 202 of a wireless device 138-146, the method includes a program resident in a computer readable medium, where the program directs a wireless device 138-146 having a device platform 202 to perform the operations of the above-described methods. Such a program can be executed on any single computer platform, or can be executed in a distributed way among several computer platforms. Furthermore, the method can be implemented by a program that directs a computer device such as user manager server 104 to perform a reconfiguration of device or network operational settings based on the gathered and processed malfunction information in event log 126 from one or more of the wireless devices 138-146.

The computer readable medium can be the data repository 203 of the computer platform 202 of the cellular telephone 138, or other wireless device 140-146. Further, the computer readable medium can be in a secondary storage media that is loadable onto a wireless device computer platform, such as a magnetic disk or tape, optical disk, hard disk, flash memory, or other storage media as is known in the art.

Further, the method may be implemented, for example, by operating portion(s) of the wireless network 134 and/or LAN 258, such as device platform 202 and user manager server 104, to execute a sequence of machine-readable instructions. The instructions can reside in various types of signal-bearing or data storage primary, secondary, or tertiary media. The media may comprise, for example, RAM (not shown) accessible by, or residing within, the components of the wireless network 134 or LAN 258. Whether contained in RAM, a diskette, or other secondary storage media, the instructions may be stored on a variety of machine-readable data storage media, such as DASD ("direct access storage device") storage (e.g., a conventional "hard drive" or a RAID ("redundant array of independent disks") array), magnetic tape, electronic read-only memory (e.g., ROM, EPROM, or EEPROM), flash memory cards, an optical storage device (e.g. CD-ROM, WORM (write once, read many), DVD, digital optical tape), paper "punch" cards, or other suitable data storage media including digital and analog transmission media.

While the foregoing disclosure shows illustrative embodiments, it should be noted that various changes and modifications could be made herein without departing from the scope of the described embodiments as defined by the appended claims. Furthermore, although elements of the described embodiments may be described or claimed in the singular, the plural is contemplated unless limitation to the singular is explicitly stated.

What is claimed is:

1. A method for managing malfunctions on a wireless device, comprising:
   receiving a tracking configuration identifying a predetermined malfunction event parameter and a predetermined operational data parameter both relating to operation of the wireless device;
   collecting operational data at predetermined times, wherein the operational data is based on the operational data parameter;
   collecting malfunction event data when the predetermined malfunction event parameter is detected;
   recording the collected operational data in a first portion of a data repository associated with the wireless device, wherein the first portion of data repository is unable to maintain the collected operational data during a power up operation of the wireless device; and
   transferring the collected operational data to a second portion of the data repository when the predetermined malfunction event parameter is detected, wherein the second portion of data repository is able to maintain the collected operational data during a power up operation of the wireless device.

2. The method of claim 1, wherein the event tracking configuration further comprises an additional malfunction event parameter, and further comprising collecting and recording additional malfunction event data corresponding to the additional malfunction event parameter in the second portion of the data repository when the predetermined malfunction event parameter is detected.

3. The method of claim 1, further comprising recording the collected malfunction event data in the second portion of the data repository when the predetermined malfunction event parameter is detected.

4. The method of claim 3, wherein the tracking configuration further comprises an additional malfunction event parameter, and further comprising collecting and recording additional malfunction event data corresponding to the additional malfunction event parameter in the second portion of the data repository when the predetermined malfunction event parameter is detected.

5. The method of claim 1, wherein the tracking configuration further comprises a predetermined tracking parameter selected from a plurality of tracking parameters, and wherein the action of collecting the operational data at predetermined times is based on the predetermined tracking parameter.

6. The method of claim 1, wherein the action of collecting the malfunction event data is based on a predetermined tracking parameter.

7. The method of claim 1, transmitting the collected operational data and the collected malfunction event data to another computer device.

8. The method of claim 7, wherein the action of transmitting further comprises transmitting across a network being at least a partially wireless network.

9. The method of claim 7, wherein the tracking configuration further comprises a predetermined reporting parameter selected from a plurality of reporting parameters, and wherein the action of transmitting further comprises transmitting based on the predetermined reporting parameter.

10. The method of claim 1, further comprising receiving a new operational setting effective to change an operation of the wireless device, wherein the new operational setting is based on the collected operational data and the collected malfunction event data.

11. The method of claim 10, wherein the action of receiving the new operational setting further comprises receiving from across a wireless network.

12. The method of claim 1, wherein the malfunction event parameter corresponds to at least one of:
  a freeze event wherein the wireless device stops operating while the wireless device remains powered on; or
  a crash event wherein the wireless device stops operating and powers down; or
  a reset event wherein the wireless device powers down and then powers up.

13. The method of claim 1, further comprising:
  determining if the second portion of the data repository comprises at least one of the collected operational data and the collected malfunction event data when the wireless device is powered on; and
  transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

14. The method of claim 13, further comprising recording a lost data indicator in the data repository if the second portion of the data repository does not comprise at least one of the collected operational data and the collected malfunction event data when the wireless device is powered on.

15. The method of claim 1, further comprising:
  generating a normal event indicator when the wireless device experiences a normal power down event;
  storing the normal event indicator in the second portion of the data repository;
  determining if the second portion of the data repository comprises the normal event indicator when the wireless device is powered on;
  determining if the second portion of the data repository comprises at least one of the collected operational data and the collected malfunction event data if the normal event indicator is not found in the second portion of the data repository; and
  transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

16. The method of claim 1, further comprising:
  generating a lime stamp at a predetermined interval;
  storing the time stamp in the data repository;
  determining if a malfunction has occurred when the wireless device is powered on based on the last stored time stamp and the predetermined interval;
  determining if the second portion of the data repository comprises at least one of the collected operational data and the collected malfunction event data if a malfunction has occurred; and
  transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

17. The method of claim 1, wherein the actions of collecting the operational data and the malfunction event data further comprise obtaining the data from one or more processing subsystems resident on a communications processing engine of the wireless device.

18. The method of claim 17, wherein the operational data comprise data relating to at least one of an input received by an input mechanism of the wireless device, a state of a component of the wireless device, a state of an application on the wireless device, and a communications related message received by or transmitted from the wireless device.

19. A computer program resident in a tangible computer readable storage medium that, when executed, directs a computer device to perform the actions of:
  receiving a tracking configuration identifying a predetermined malfunction event parameter and an operational data parameter both relating to operation of the wireless device;
  collecting operational data at predetermined times, wherein the operational data is based on the operational data parameter;
  collecting malfunction event data when the predetermined malfunction event parameter is detected;
  recording the collected operational data in a first portion of a data repository associated with the wireless device, wherein the first portion of data repository is unable to maintain the collected operational data during a power up operation of the wireless device; and transferring the collected operational data to a second portion of the data repository when the predetermined malfunction event parameter is detected, wherein the second portion of data repository is able to maintain the collected operational data during a power up operation of time wireless device.

20. A wireless device, comprising:
a means for receiving a tracking configuration identifying a predetermined malfunction event parameter and an operational data parameter both relating to operation of the wireless device;
a means for collecting operational data at predetermined times, wherein the operational data is based on the operational data parameter; a means for collecting malfunction event data when the predetermined malfunction event parameter is detected;
a means for recording the collected operational data in a first portion of a data repository associated with the wireless device, wherein the first portion of data repository is unable to maintain the collected operational data during a power up operation of the wireless device; and
a means for transferring the collected operational data to a second portion of the data repository when the predetermined malfunction event parameter is detected, wherein the second portion of data repository is able to maintain the collected operational data during a power up operation of the wireless device.

21. The device of claim 20, further comprising:
a means for determining if the second portion of the data repository comprises at least one of the collected, operational data and the collected malfunction event data when the wireless device is powered on; and
a means for transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

22. The computer program product of claim 19, wherein the computer program product, when executed, further directs the computer device to perform the actions of:
determining if the second portion of the data repository comprises at least one of the collected operational data and the collected malfunction event data when the wireless device is powered on; and
transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

23. The computer program product of claim 19, wherein the computer program product, when executed, further directs the computer device to perform the action of recording a lost data indicator in the data repository if the second portion of the data repository does not comprise at least one of the collected operational data and the collected malfunction event data when the wireless device is powered on.

24. The computer program .product of claim 19, wherein the computer program product, when executed, further directs the computer device to perform the actions of:
generating a normal event indicator when the wireless device experiences a normal power down event;
storing the normal event indicator in the second portion of the data repository;
determining if the second portion of the data repository comprises the normal event indicator when the wireless device is powered on;
determining if the second portion of the data repository comprises at least one of the collected operational data and the collected malfunction event data if the normal event indicator is not found in the second portion of the data repository; and
transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

25. The computer program product of claim 19, wherein the computer program product, when executed, further directs the computer device to perform the actions of:
generating a time stamp at a predetermined interval;
storing the time stamp in the data repository;
determining if a malfunction has occurred when the wireless device is powered on based on the last stored time stamp and the predetermined interval;
determining if the second portion of the data repository comprises at least one of the collected operational data and the collected malfunction event data if a malfunction has occurred; and
transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

26. The wireless device of claim 20, further comprising:
means for determining if the second portion of the data repository comprises at least one of the collected operational data and the collected malfunction event data when the wireless device is powered on; and
means for transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

27. The wireless device of claim 20, further comprising means for recording a lost data indicator in the data repository if the second portion of the data repository does not comprise at least one of the collected operational data and the collected malfunction event data when the wireless device is powered on.

28. The wireless device of claim 20, further comprising:
means for generating a normal event indicator when the wireless device experiences a. normal power down event;
means for storing the normal event indicator in the second portion of the data repository;
means for determining if the second portion of the data repository comprises the normal event indicator when the wireless device is powered on;
means for determining if the second portion of the data repository comprises. at least one of the collected operational data and the collected malfunction event data if the normal event indicator is not found in the second portion of the data repository; and
means for transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

29. The wireless device of claim 20, further comprising:
means for generating a time stamp at a predetermined interval;
means for storing the time stamp in the data repository;
means for determining if a malfunction has occurred when the wireless device is powered on based on the last stored time stamp and the predetermined interval;
means for determining if the second portion of the data repository comprises at least one of the collected operational data and the collected malfunction event data if a malfunction has occurred; and
means for transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

30. A method for managing malfunctions on a wireless device, comprising:
generating a tracking configuration identifying a predetermined operational data parameter and a predetermined malfunction event parameter both relating to operation of the wireless device;
receiving operational data and malfunction event data collected by the wireless device based on the malfunction event configuration, wherein the operational data corresponds to the predetermined operational data parameter and the malfunction event data corresponds to the predetermined malfunction event parameter; and
generating a malfunction event report having a malfunction event characteristic based on at least one of the collected operational data and the collected malfunction event data, wherein the malfunction event characteristic is based on a comparison of at least one of the operational data and the malfunction event data with a malfunction standard.

31. The method of claim 30, wherein the malfunction event parameter corresponds to at least one of:
a freeze event wherein the wireless device stops operating while the wireless device remains powered on; or
a crash event wherein the wireless device stops operating and powers down; or
a reset event wherein the wireless device powers down and then powers up.

32. The method of claim 30, wherein generating the tracking configuration further comprises selecting the predetermined operational data parameter from a plurality of operational data parameters, and selecting the predetermined malfunction event parameter from a plurality of malfunction event parameters.

33. The method of claim 30, wherein generating the tracking configuration further comprises generating a predetermined tracking parameter selected from a plurality of tracking parameters and generating a predetermined reporting parameter selected from a plurality of reporting parameters, wherein the predetermined tracking parameter dictates to the wireless device when to collect the operational data and wherein the predetermined reporting parameter dictates to the wireless device when to transmit the collected operational data and malfunction event data.

34. The method of claim 30, wherein generating the tracking configuration further comprises generating an additional malfunction event parameter corresponding to additional malfunction information to collect when the predetermined malfunction event is detected by the wireless device.

35. The method of claim 30, further comprising generating a new operational setting for the wireless device based on the received operational data and malfunction event data, wherein the new operational setting changes an operation of at least one of the wireless device and a wireless network component associated with the wireless device in order to reduce an occurrence of the malfunction event parameter.

36. A computer program resident in a tangible computer readable storage medium that, when executed, directs a computer device to perform the actions of:
generating a tracking configuration identifying a predetermined operational data parameter and a predetermined malfunction event parameter both relating to operation of the wireless device;
receiving operational data and malfunction event data collected by the wireless device, wherein the operational data is based on the predetermined operational data parameter and the malfunction event data is based on the predetermined malfunction event parameter; and
generating a malfunction event report having a malfunction event characteristic based on at least one of the collected operational data and the collected malfunction event data, wherein the malfunction event characteristic is based on a comparison of at least one of the operational data and the malfunction event data with a malfunction standard.

37. The computer program product of claim 36, wherein the computer program product, when executed, further directs the computer device to perform the action of generating the tracking configuration further comprises generating an additional malfunction event parameter corresponding to additional malfunction information to collect when the predetermined malfunction event is detected by the wireless device.

38. An apparatus for managing malfunctions on a wireless device, comprising:
a means for generating a tracking configuration identifying a predetermined operational data parameter and a predetermined malfunction event parameter, the predetermined operational data parameter corresponding to operational data generated during operation of the wireless device, the predetermined malfunction event parameter corresponding to malfunction event data generated during operation of the device;

a means for receiving the collected operational data and the collected malfunction event data collected by the wireless device based on the tracking configuration; and a means for generating a malfunction event report having a malfunction event characteristic based on at least one of the collected operational data, the collected malfunction event data and the collected additional malfunction event information, wherein the malfunction event characteristic is based on a comparison of at least one of the operational data and the malfunction event data with a malfunction standard.

39. The apparatus of claim 38, further comprising means for generating the tracking configuration further comprises generating an additional malfunction event parameter corresponding to additional malfunction information to collect when the predetermined malfunction event is detected by the wireless device.

40. An apparatus for managing malfunctions on a wireless device, comprising:

a configuration generator in communication with the computer platform and operable to generate a malfunction event configuration having a predetermined operational data parameter and a predetermined malfunction event parameter, wherein the predetermined operational data parameter corresponds to operational data on a computer platform of the wireless device, and wherein the predetermined malfunction event parameter corresponds to malfunction event data on the computer platform of the wireless device;

a data repository operable to receive the operational data and the malfunction event data collected by the wireless device based on the malfunction event configuration, wherein the operational data is based on the predetermined operational data parameter and the malfunction event data is based on the predetermined malfunction event parameter; and an analysis engine operable to generate a malfunction event report having a malfunction event characteristic based on at least one of the collected operational data and the collected malfunction event data, wherein the malfunction event characteristic is based on a comparison of at least one of the operational data and the malfunction event data with a malfunction standard.

41. The device of claim 40, wherein the malfunction event parameter corresponds to at least one of:

a freeze event wherein the wireless device stops operating while the wireless device remains powered on; or a crash event wherein the wireless device stops operating and powers down; or a reset event wherein the wireless device powers down and then powers up.

42. The device of claim 40, wherein the configuration generator is further operable to select the predetermined operational data parameter from a plurality of operational data parameters and to select the predetermined malfunction event parameter from a plurality of malfunction event parameters.

43. The device of claim 40, wherein the tracking configuration further comprises an additional malfunction event parameter corresponding to additional malfunction information to collect when the predetermined malfunction event is detected by the wireless device.

44. The device of claim 40, wherein the analysis engine is further operable to generate a malfunction event characteristic determined by a comparison of at least one of the operational data and the malfunction event data with the malfunction standard.

45. The device of claim 40, further comprising an optimization module operable to generate a new operational setting for the wireless device based on the received operational data and the received malfunction event data, wherein the new operational setting changes an operation of at least one of the wireless device and a wireless network component associated with the wireless device in order to reduce an occurrence of the malfunction event parameter.

46. At least one processor configured to perform the actions of:

generating a tracking configuration identifying a predetermined operational data parameter and a predetermined malfunction event parameter both relating to operation of the wireless device;

receiving operational data and malfunction event data collected by the wireless device, wherein the operational data is based on the predetermined operational data parameter and the malfunction event data is based on the predetermined malfunction event parameter; and generating a malfunction event report having a malfunction event characteristic based on at least one of the collected operational data and the collected malfunction event data, wherein the malfunction event characteristic is based on a comparison of at least one of the operational data and the malfunction event data with a malfunction standard.

47. The at least one processor of claim 46, further configured to perform the action of generating the tracking configuration further comprises generating an additional malfunction event parameter corresponding to additional malfunction information to collect when the predetermined malfunction event is detected by the wireless device.

48. At least one processor configured to perform the actions of:

receiving a tracking configuration identifying a predetermined malfunction event parameter and an operational data parameter both relating to operation of the wireless device;

collecting operational data at predetermined times, wherein the operational data is based on the operational data parameter;

collecting malfunction event data when the predetermined malfunction event parameter is detected; recording the collected operational data in a first portion of a data repository associated with the wireless device, wherein the first portion of data repository is unable to maintain the collected operational data during a power up operation of the wireless device; and transferring the collected operational data to a second portion of the data repository when the predetermined malfunction event parameter is detected, wherein the second portion of data repository is able to maintain the collected operational data during a power up operation of the wireless device.

49. The at least one processor of claim 48, further configured to perform the actions of:

determining if the second portion of the data repository comprises at least one of the collected operational data and the collected malfunction event data when the wireless device is powered on; and transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

50. The at least one processor of claim 48, further configured to perform the action of recording a lost data indicator in the data repository if the second portion of the data repository does not comprise at least one of the collected operational data and the collected malfunction event data when the wireless device is powered on.

51. The at least one processor of claim 48, further configured to perform the actions of:
   generating a normal event indicator when the wireless device experiences a normal power down event;
   storing the normal event indicator in the second portion of the data repository;
   determining if the second portion of the data repository comprises the normal event indicator when the wireless device is powered on;
   determining if the second portion of the data repository comprises at least one of the collected operational data and the collected malfunction event data if the normal event indicator is not found in the second portion of the data repository; and
   transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

52. The at least one processor of claim 48, further configured to perform the actions of:
   generating a time stamp at a predetermined interval;
   storing the time stamp in the data repository;
   determining if a malfunction has occurred when the wireless device is powered on based on the last stored time stamp and the predetermined interval;
   determining if the second portion of the data repository comprises at least one of the collected operational data and the collected malfunction event data if a malfunction has occurred; and
   transferring a found one of the collected operational data and the collected malfunction event data from the second portion of the data repository to a third portion of the data repository if the second portion of the data repository comprises at least one of the collected operational data and the collected malfunction event data when the wireless device is powered on, wherein the third portion of the data repository comprises a persistent memory having a slower writing access than the second portion of the data repository.

* * * * *